Jan. 1, 1952     C. A. WALTZ     2,580,625
FISHING ROD HOLDER
Filed June 1, 1950
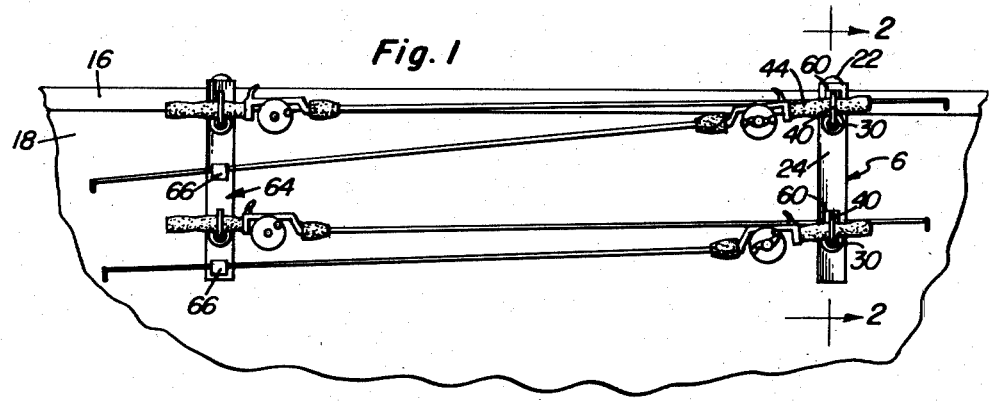
Fig. 1
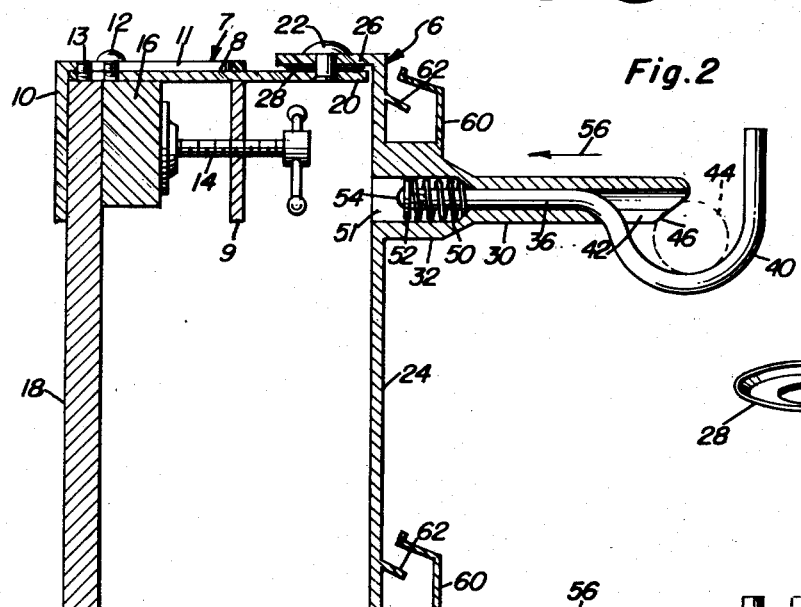
Fig. 2
Fig. 4
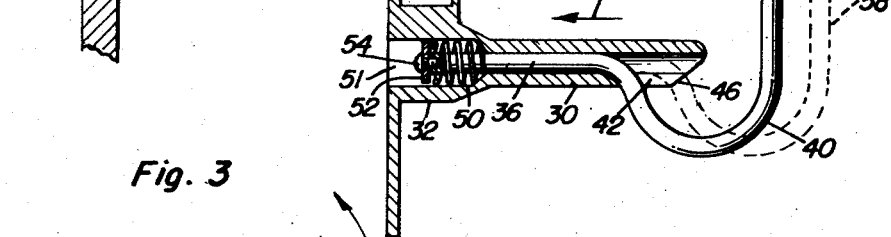
Fig. 3
Charles A. Waltz
INVENTOR.
BY
*Clarence A. O'Brien*
*and Harvey B. Jacobson*
Attorneys Patented Jan. 1, 1952

2,580,625

UNITED STATES PATENT OFFICE 2,580,625

FISHING ROD HOLDER

Charles A. Waltz, Normal, Ill., assignor of one-half to Henry A. Huff, Normal, Ill.

Application June 1, 1950, Serial No. 165,453

2 Claims. (Cl. 211—86)

This invention relates to new and useful improvements and structural refinements in fishing rod holders, and the principal object of the invention is to facilitate convenient supporting of fishing rods in a boat.

An important feature of the invention resides in the provision of a holder which may be readily adjusted so as to support fishing rods in an appropriate, inobtrusive position, while another feature of the invention resides in the provision of means for releasably locking the fishing rods in place.

Some of the advantages of the invention reside in its simplicity of construction, in its efficient and dependable operation, and in its adaptability for use in boats and with fishing rods of different sizes and types.

With the above more important objects and features in view, and such other objects and features as may become apparent as this specification proceeds, the invention consists essentially of the arrangement and construction of parts as illustrated in the accompanying drawings, in which:

Figure 1 is an elevational view of the invention in situ in a boat;

Figure 2 is a vertical sectional view, taken substantially in the plane of the line 2—2 in Figure 1;

Figure 3 is a fragmentary top plan view of the subject shown in Figure 2, and;

Figure 4 is a perspective view of a resilient washer used in the invention.

Like characters of reference are employed to designate like parts in the specification and throughout the several views.

Referring now to the accompanying drawings in detail, more particularly to Figures 2, 3 and 4, the invention consists of a fishing rod holder which is designated generally by the reference character 6 and embodies in its construction a supporting clamp 7 consisting of a stationary section 8 provided with a depending lug 9, and a coacting movable section 10 provided with a slot 11 to receive a screw 12 whereby the two sections are adjustably secured together. A set screw 13 is provided on the section 10 and is slidable in the slot 11, whereby relative rotation of the sections about the screw 12 is prevented. The lug 9 carries a clamping screw 14, whereby the entire clamp 7 may be secured to the gunwale 16 of a boat 18, the adjustment facilitated by the sections 8, 10 permitting the clamp to be applied to gunwales of different thicknesses.

The clamp section 8 is also provided with a horizontal extension 20 which projects inwardly into the boat and carries a vertical pivot pin 22.

A vertically disposed supporting strap 24 is provided at its upper end with a horizontally angulated portion 26 which is rotatably mounted on the pivot pin 22, but a resilient, convexo-concave washer 28 is interposed between the extension 20 and the portion 26 so as to resist rotation of the latter relative to the former.

A horizontally disposed, tubular member 30 is provided with a thickened inner portion 32 whereby it is integrally connected to the strap 24, while a shank 36 is slidable in the member 30, as shown.

A fishing rod receiving hook or socket 40 is provided at the outer end of the shank 36, and the outer end portion of the member 30 is formed in one side thereof with a slot 42 having an open outer end, so that the socket or hook 40 may extend downwardly from the member 30 to receive a handle of a fishing rod, as indicated at 44.

The outer end portion of the member 30 affords a bevelled detent 46 which is engageable with the fishing rod handle 44, and it is to be noted that while the slot 42 permits the shank 36 and the socket 40 to slide inwardly and outwardly, that is, toward and away from the detent 46, rotation of the shank in the member 30 is not possible. A compression spring 50 is provided on the shank 36 in a counterbore 51 formed in the portion 32 of the member 30, and a washer 52 which is held on the shank by a screw 54, abuts the spring 50 so as to urge the shank 36 in a direction of the arrow 56, thus clamping the handle 44 against the bevelled detent 46 and securely retaining the fishing rod handle in position until such time as the socket or hook 40 is manually withdrawn as indicated by the dotted lines 58 in the lower portion of Figure 2.

As already stated, the socket 40 is intended to receive the handle 44 of a fishing rod and if desired, two of the sockets and members 30 may be provided in vertically spaced relation on the strap 24, as shown. In addition, angulated brackets 60 may be provided integrally on the strap 24 to receive tip portions of fishing rods.

Inwardly and downwardly extending lugs 62 are provided integrally on the strap 24 within the brackets 60 so as to prevent the fishing rod tips from accidentally leaving the brackets in an upward direction, and when the invention is placed in use the entire holder 6 is secured to the gunwale of a boat as already explained, while a second, similar holder 64 is also secured to the gunwale at a point spaced longitudinally from the holder 6, as illustrated in Figure 1.

The holder 64 is substantially the same as the holder 6 with the exception that while the brackets 60 and lugs 62 on the holder 6 are provided immediately above the members 30, more particularly, above the portions 32 of the members 30, in the holder 64 the brackets and lugs are spaced downwardly, as indicated at 66.

In any event, several fishing rods may be applied to the two holders by inserting the handle portion of each fishing rod in the hook or socket 40 of one holder and the tip portion of the same rod in the bracket 60 or 66, as the case may be, of the second holder, whereby the several fishing rods may be accommodated without interfering with one another.

It is believed that the advantages and use of the invention will be clearly understood from the foregoing disclosure and accordingly, further description thereof at this point is deemed unnecessary.

While in the foregoing there has been shown and described the preferred embodiment of the present invention, it is to be understood that minor changes in the details of construction and arrangement of parts may be resorted to without departing from the spirit and scope of the invention as claimed.

Having described the invention, what is claimed as new is:

1. In a fishing rod holder, a support adapted for attachment to the gunwale of a boat, a tubular member secured at one end thereof to said support and provided at its outer end with a projecting detent, a shank slidable in said member and projecting outwardly therefrom at a point adjacent said detent, a hook-shaped fishing rod socket provided at the outer end of said shank and movable toward and away from the detent when the shank is slid in said member, and resilient means for sliding said shank inwardly in said member whereby said detent may retain a fishing rod in said socket.

2. The device as defined in claim 1 wherein said member is provided in the outer end portion thereof with a longitudinally extending slot having an open outer end, the socket forming portion of said shank being receivable in said slot when the shank is slid inwardly, whereby to prevent rotation of the socket relative to said detent.

CHARLES A. WALTZ.

REFERENCES CITED

The following references are of record in the file of this patent:

UNITED STATES PATENTS

| Number | Name | Date |
|---|---|---|
| 279,481 | Eyster | June 12, 1883 |
| 569,289 | Lynch | Oct. 13, 1896 |
| 1,842,545 | Glantz | Jan. 26, 1932 |
| 1,891,163 | Kabele | Dec. 13, 1932 |
| 2,087,757 | Foss | July 20, 1937 |
| 2,430,112 | Hamre | Nov. 14, 1947 |
| 2,441,450 | Smigleski | May 11, 1948 |